United States Patent [19]
Pientke et al.

[11] Patent Number: 5,729,106
[45] Date of Patent: Mar. 17, 1998

[54] DEVICE FOR OPERATING A WIPER

[75] Inventors: Rainer Pientke, Achern; Hans Meier, Ottersweier; Henry Blitzke, Buehl, all of Germany

[73] Assignee: Robert Bosch GmbH, Stuttgart, Germany

[21] Appl. No.: 654,069

[22] Filed: May 28, 1996

[30] Foreign Application Priority Data

May 27, 1995 [DE] Germany .................. 195 19 471.3

[51] Int. Cl.$^6$ .................................................. B60S 1/08
[52] U.S. Cl. ................... 318/483; 318/443; 318/DIG. 2
[58] Field of Search ................................. 318/443, 444, 318/480, 483, DIG. 2; 15/250.001

[56] References Cited

U.S. PATENT DOCUMENTS

| | | | |
|---|---|---|---|
| 4,355,271 | 10/1982 | Noack | 318/480 |
| 4,476,419 | 10/1984 | Fukatsu et al. | 318/444 |
| 5,059,877 | 10/1991 | Teder | 318/444 |

FOREIGN PATENT DOCUMENTS

| | | |
|---|---|---|
| 3941905 A1 | 6/1990 | Germany . |
| 4112847 A1 | 10/1992 | Germany . |

*Primary Examiner*—Bentsu Ro
*Attorney, Agent, or Firm*—Spencer & Frank

[57] ABSTRACT

A device for operating a windshield wiper, with the device including a sensor for detecting the degree of moistness of a windshield, an evaluator for receiving a signal from the sensor, and a control unit which receives a control signal from the evaluator for operating the windshield wiper if a difference between a reference value and values derived from the sensor signal exceeds a predetermined threshold value. The evaluator includes a detector stage for determining whether the sensor signal or the values derived therefrom lie within a normal range (UGR, OGR), and a selector stage for switching to a predetermined base interval mode of operating of the wipes when the detector stage determines that the sensor signal or the values derived therefrom lie outside of the normal range.

18 Claims, 1 Drawing Sheet

DEVICE FOR OPERATING A WIPER

CROSS REFERENCE TO RELATED APPLICATION

This application claims the priority of German Application No. DE 195 19 471.3-22 of May 27, 1995, the subject matter of which is hereby incorporated by reference.

The subject matter of this application is also related to the subject matter of a copending application Ser. No. 08/652,649, filed in the U.S. Patent and Trademark Office on May 28, 1996, having the same inventors as the present application, the copending application being Attorney Docket number BOSCH 0212, which copending application claims the benefit of priority of DE 195 19 500.0-22 of May 27, 1995, the subject matter of the copending application, and the associated priority document being hereby incorporated by reference.

BACKGROUND OF THE INVENTION

1. Field of the Invention

The invention relates to the field of wiper control, and more particularly, to a device for operating a windshield wiper, having a sensor for detecting a degree of moistness of a windshield, an evaluator for receiving a sensor signal, and a triggering unit which receives a control signal from the evaluator for operating the windshield wiper, if the difference between a reference value and an actual measured value derived from the sensor signal exceeds a predetermined threshold value.

2. Background Information

A device for operating a windshield wiper of this general type is known from DE-A-41 12 847. In this known device, the equilibrium or resting level of a sensor signal or a measured value derived therefrom is matched to respective operating conditions, such as the structure of the windshield or the connection of the sensor with the windshield, for example, by changing an amplification factor or the radiation output of a radiation source present in the sensor. Abnormal conditions can arise, however, in which such matching is no longer possible.

SUMMARY OF THE INVENTION

In order to solve the above-mentioned problem the present invention provides the following novel features and advantages.

It is an object of the invention to provide an improvement in a device of the type described at the outset so that a suitable wiping operation is possible, even with the occurrence of an abnormal condition.

This object is attained in a device in accordance with the present invention in that the evaluator has a detector stage through which it can be determined whether the sensor signal or the actual measured values lie within a normal range. If it is determined that the sensor signal or the actual measured values lie outside of the normal range, switching to a predetermined base interval mode of operation for the wind-shield is effected with a selector stage.

It is thereby possible by means of the detector stage to provide a satisfactory wiping operation through a transition to the predetermined base interval even under abnormal conditions. In this way, the functional range of the device is increased, since in such a situation a satisfactory interval operation is also made possible by means of the base interval, besides manual selection of stage 1 and stage 2. The emergency function achieved in this manner becomes active, for example, in case of a heavily soiled windshield, a damaged windshield, a situation having unsatisfactory coupling, such as a drop in the sensor performance, or with a very clear windshield.

The device can be designed in such a way that the detector stage has a comparator device, by means of which it can be determined whether the sensor signal or the measured values are less than a lower threshold or greater than an upper threshold, which delimit a normal range.

It can be determined that an abnormal state is present by, for example, having the detector stage recognize an abnormal sensor signal when the signal level cannot be brought into the normal range by selecting the amplification.

It is advantageous for the wiping operation during the abnormal stage if the base interval has an average length of an interval operation which is 4.5 seconds, for example.

In a further embodiment, the evaluation circuit is modified to have an interrogation device through which the cause of the abnormal sensor signal can be determined. With this modification, it is possible to detect and correct the abnormal state without difficulty. The particular causes which can be recognized with the interrogation device include, for example, a break in a signal line, an unsatisfactory connection of the sensor, damage to the windshield, heavy dirt on the windshield, or a very clear windshield.

In one embodiment, in a device for operating a windshield wiper, the device including a sensor for detecting the degree of moistness of a windshield, an evaluator for receiving a signal from the sensor, and a control unit which receives a control signal from the evaluator for operating the windshield wiper if a difference between a reference value and values derived from the sensor signal exceeds a predetermined threshold value, the evaluator includes a detector stage for determining whether the sensor signal or the values derived therefrom lie within a normal range (UGR, OGR), and a selector stage for switching to a predetermined base interval when the detector stage determines that the sensor signal or the values derived therefrom lie outside of the normal range.

The detector stage may include a comparator for determining whether the sensor signal or the values derived therefrom are less than a lower threshold value or greater than an upper threshold value, the lower and upper threshold values defining the normal range. The base interval has the average length of an interval operation, for example, the base interval is 4.5 seconds.

According to a further embodiment, the detector stage recognizes an abnormal sensor signal when the sensor signal level cannot be brought into the normal range by selection of signal level amplification. In a further embodiment, the evaluator comprises means for determining reasons for an abnormal sensor signal.

BRIEF DESCRIPTION OF THE DRAWINGS

The above and other features of the invention will become apparent from the following detailed description taken with the drawings in which.

DETAILED DESCRIPTION OF THE PREFERRED EMBODIMENT(S)

The invention will now he described in more detail by example with reference to the exemplary embodiment shown in the Figures. It should be kept in mind that the following described embodiment is only presented by way of example and should not be construed as limiting the inventive concept to any particular physical configuration.

Figure 1:
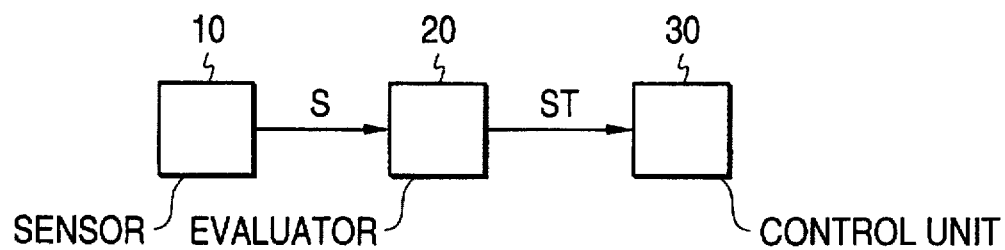
FIG. 1 is a block diagram of an exemplary device according to the invention.

FIG. 1 shows in a diagrammatic view, the main components of an exemplary embodiment of a device in accordance with the invention. A sensor 10 provides a sensor signal S, which may or may not have already been subjected to some preprocessing. Sensor signal S is received by an evaluator 20 and is processed therein to generate a control signal ST. Control signal ST is output from the evaluator to control unit 30 which controls a wiper, e.g., an automobile windshield wiper, (not shown).

Figure 2:
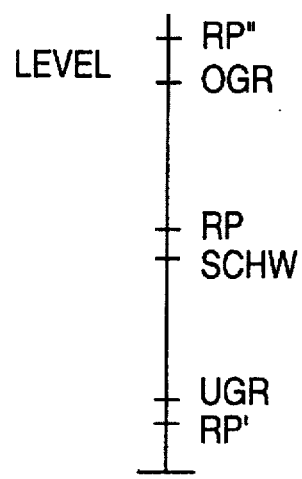
FIG. 2 is a level representation in which various signal levels are shown.

FIG. 2 shows a level representation with a lower limit level UGR and an upper limit level OGR which delimit a normal range between them, in which a suitable equilibrium level RP of sensor signal S is set by means of the sensor 10 and/or the evaluator 20, for example by varying the radiation output of a radiation source provided in the sensor 10, or an amplification factor of the evaluator 20. If sensor signal S or an actual measured value derived therefrom falls below a preset threshold SCHW, a wiping operation is triggered, wherein further criteria can also be taken into consideration.

Because of external conditions, it is possible for situations to arise in which a departure from the normal range between the lower threshold UGR and the upper threshold OGR takes place and wherein it is no longer possible to set a suitable equilibrium level for selecting an optimally matched wiping operation. Such an abnormal state can be caused, for example, by a greatly soiled windshield, which can no longer be easily cleaned, by damage to the windshield, by unsatisfactory connection of the sensor or by a very clear windshield.

In the first three abnormal cases, the equilibrium level, represented by RP", would have to be raised to a level above the upper threshold OGR, while in the latter case the equilibrium level, represented by RP', would have to be lowered below the lower level UGR. However, these equilibrium levels cannot be set at all or at least not dependably set, therefore, in such cases, a dependable wiping operation can no longer be dependably selected.

The evaluator 20 is therefore equipped with a detector stage, through which it can be determined whether the sensor signal S or the actual measured values derived therefrom lie within the normal range.

For this purpose, it is determined through a comparator whether the equilibrium level of the sensor signal S or of the measured values derived therefrom would have to be amplified in such a way that the equilibrium level RP would lie outside the normal range. If such an abnormal state is detected, for which sensible signal processing and a suitable wiping operation are no longer possible, this is recognized in the evaluator 20 and switching to a preset base interval is made through a selector stage.

Figure 3:
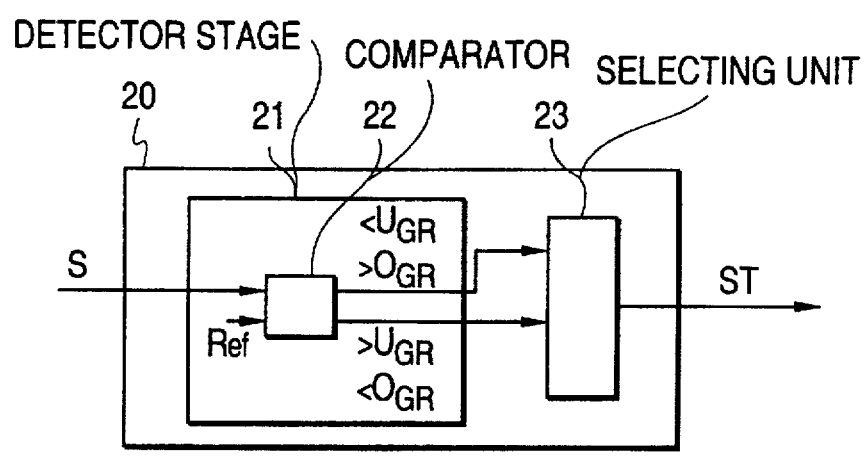
FIG. 3 is a block diagram of some details of the evaluator block of FIG. 1.

With reference to FIG. 3 which illustrates the evaluator 20 in more detail, the sensor signal S is delivered to a detector block 21 which includes a comparator 22. The comparator 22 compares the sensor signal S, or a signal derived therefrom, with a reference signal Ref, corresponding to lower and upper boundary levels (limits) UGR and OGR. If the sensor signal S, or corresponding signal derived therefrom, lies outside the normal interval UGR-OGR, selecting unit 23 switches to the basic interval. Otherwise, the normal control signal ST is generated in the evaluator 20, e.g., by the selecting unit 23, as illustrated.

This evaluation relative to the lower limit UGR and the upper limit OGR, has the result that different defects can be discriminated between, such as a dirty windshield or a windshield that is too bright (very clear). As would be understood by one skilled in the art, the blocks 21 to 23 could be realized as hard-wired devices, or as program stages in a micro-controller, for example.

Advantageously, an emergency operation of the device can be realized in this way, such that the functional range is increased because, besides the possible manual selection of first and second wiper stages, an interval operation is additionally made possible with the base interval.

It will be understood that the above description of the preferred embodiment of the present invention is susceptible to various modifications, changes, and adaptations, and the same are intended to be comprehended within the meaning and range of equivalents of the appended claims.

What is claimed is:

1. In a device for operating a windshield wiper, the device including a sensor for detecting the degree of moistness of a windshield, an evaluator for receiving a signal from the sensor, and a control unit, which receives a control signal from the evaluator, for operating the windshield wiper if a difference between a reference value and values derived from the sensor signal exceeds a predetermined threshold value, the evaluator comprising:

a detector stage for determining whether the sensor signal or the values derived therefrom lie within a normal total range (UGR, OGR) in which an equilibrium level (RP) of the sensor signal can be adjusted by the device of the evaluator; and, a selector stage for switching to a predetermined base interval when the detector stage determines that the sensor signal or the values derived therefrom lie outside of the normal range.

2. A device in accordance with claim 1, wherein the detector stage comprises a comparator for determining whether the sensor signal or the values derived therefrom are less than a lower threshold value or greater than an upper threshold value, the lower and upper threshold values defining the normal range.

3. A device in accordance with claim 2, wherein the base interval has the average length of an interval operation.

4. A device in accordance with claim 2, wherein the base interval is 4.5 seconds.

5. A device in accordance with claim 2, wherein the detector stage recognizes an abnormal sensor signal when the sensor signal level cannot be brought into the normal range by selection of signal level amplification.

6. A device in accordance with claim 5, wherein the base interval has the average length of an interval operation.

7. A device in accordance with claim 6, wherein the base interval is 4.5 seconds.

8. A device in accordance with claim 7, wherein the evaluator further comprises means for determining reasons for an abnormal sensor signal.

9. A device in accordance with claim 8, wherein the reasons for an abnormal sensor signal which can be determined by the determining means include: a break of a signal line, an unsatisfactory connection of the sensor, damage to a windshield, heavy dirt on the windshield, and a very clear windshield.

10. A device in accordance with claim 1, wherein the detector stage recognizes an abnormal sensor signal when the sensor signal level cannot be brought into the normal range by selection of signal level amplification.

11. A device in accordance with claim 1, wherein the base interval has the average length of an interval operation.

12. A device in accordance with claim 1, wherein the evaluator further comprises means for determining reasons for an abnormal sensor signal.

13. In a device for operating a windshield wiper, the device including a sensor for detecting the degree of moistness of a windshield, an evaluator for receiving a signal from the sensor, and a control unit which receives a control signal from the evaluator for operating the windshield wiper if a difference between a reference value and values derived from the sensor signal exceeds a predetermined threshold value, the evaluator comprising:

a detector stage for determining whether the sensor signal or the values derived therefrom lie within a normal range (UGR, OGR), with the detector stage comprising a comparator for determining whether the sensor signal or the values derived therefrom are less than a lower threshold value or greater than an upper threshold value, the lower and upper threshold values defining the normal range; and, a selector stage for switching to a predetermined base interval when the detector stage determines that the sensor signal or the values derived therefrom lie outside of the normal range, and, wherein the detector stage recognizes an abnormal sensor signal when the sensor signal level cannot be brought into the normal range by selection of signal level amplification.

14. A device in accordance with claim 13, wherein the base interval has the average length of an interval operation.

15. A device in accordance with claim 14, wherein the base interval is 4.5 seconds.

16. A device in accordance with claim 15, wherein the evaluator comprises means for determining reasons for an abnormal sensor signal.

17. A device in accordance with claim 16, wherein the reasons for an abnormal sensor signal which can be determined by the determining means include: a break of a signal line, an unsatisfactory connection of the sensor, damage to a windshield, heavy dirt on the windshield, and a very clear windshield.

18. In a device for operating a windshield wiper, the device including a sensor for detecting the degree of moistness of a windshield, an evaluator for receiving a signal from the sensor, and a control unit which receives a control signal from the evaluator for operating the windshield wiper when a difference between a reference value and values derived from the sensor signal exceeds a predetermined threshold value, the improvement wherein the evaluator comprises:

a detector stage for determining whether the sensor signal or the values derived therefrom lie within a total normal operating range (UGR, OGR) in which a resting level (RP) for the sensor signal normally is located; and, a selector stage for switching from said control signal to a control signal which results in a predetermined base interval mode of operation of the windshield wiper when the detector stage determines that the sensor signal or the values derived therefrom lie outside of the normal range.

* * * * *